UNITED STATES PATENT OFFICE.

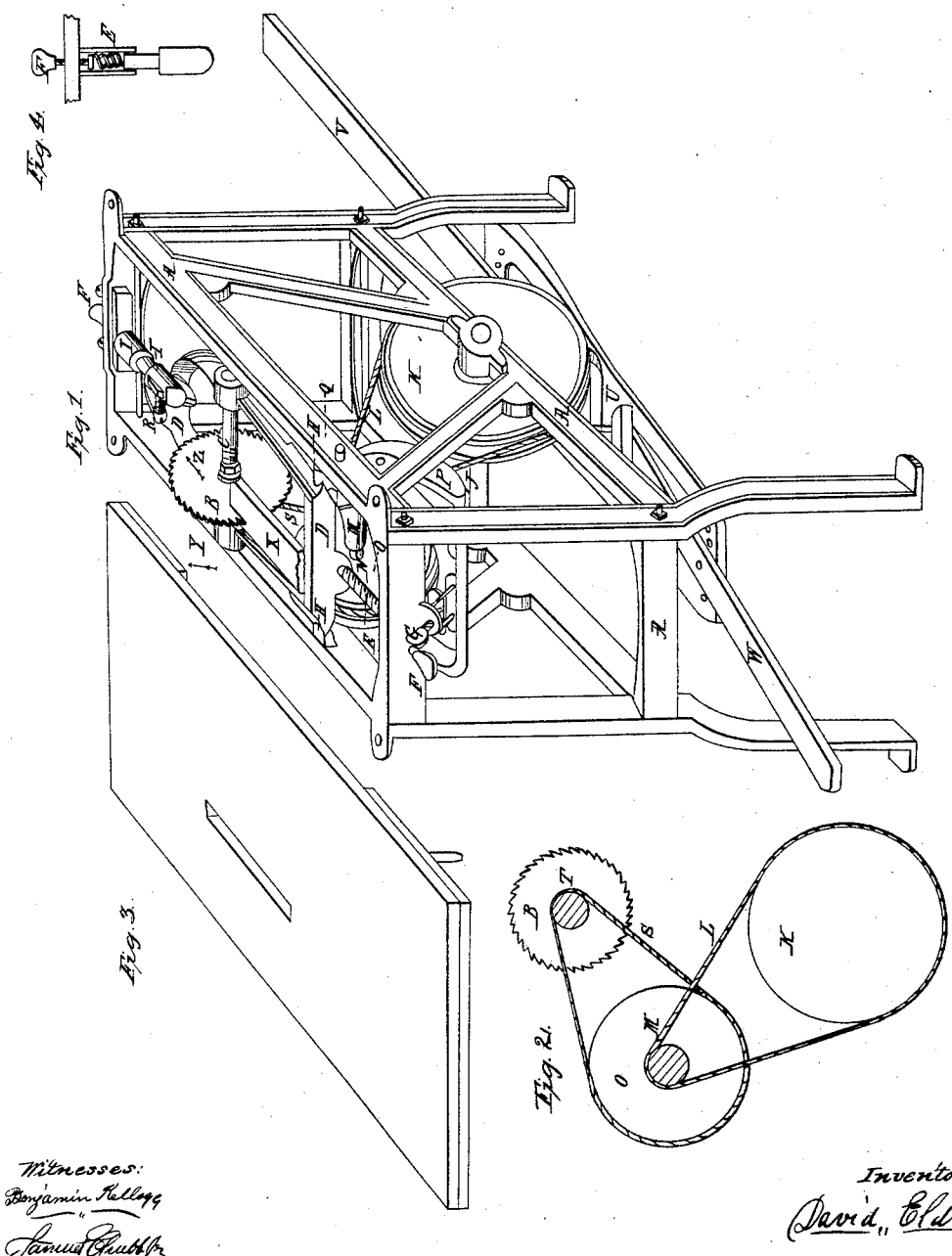
D. Eldridge,
Circular Sawing Machine.
N° 30,672. Patented Nov. 20, 1860.

DAVID ELDRIDGE, OF PHILADELPHIA, PENNSYLVANIA.

METHOD OF HANGING CIRCULAR SAWS.

Specification of Letters Patent No. 30,672, dated November 20, 1860.

*To all whom it may concern:*

Be it known that I, DAVID ELDRIDGE, of Philadelphia, in the county of Philadelphia and State of Pennsylvania, have invented a new and useful Improvement in the Mode of Running Circular Saws; and I do hereby declare that the following is a full, clear, and exact description of the construction and operation of the same, reference being had to the annexed drawings, making a part of this specification, in which—

Figure 1 is a perspective view; Fig. 2, a section showing the shafts, belts, and pulleys; Figs. 3, the top; Fig. 4, a section showing a spring, &c.

A, A, A, represents the frame; B, the saw; C, the arbor; D, D, the arbor frame; E, E, two springs; F, F, twe set-screws; G, a set-screw; H, H, are knife edge bearings; I, I, a partial support for arbor frame containing the spring E, shown in Fig. 4; J, J, J, a shaft, crank and pitman; K, a driving pulley; L, a belt; M, a small pulley; N, a shaft; O, a driving pulley; P, a frame to support the shaft N, and pulleys M, and O; Q, a set screw; R, a set screw; S, a belt; T, a small pulley on the arbor; U, V, W, are sections forming the treadle; X, a board as if in the act of being cut; Y, an arrow; Z, an arrow.

To enable others skilled in the art to make and use my improvement, I will proceed to describe its construction and operation.

The frame can be made of either wood or iron and of any required size; but I design to make them of iron and in size about one foot to three inches in the drawings. The arbor frame D, D, is of cast iron; it is movable, working in the knife edge bearings H, H.

I design that the partial support of the arbor frame I, I, to be used under workbenches to save expense and room—in all other cases it can be dispensed with, substituting therefor two other knife edge bearings, like unto H, H, which four bearings should be cast separate from the frame, which will give place between the frame and said bearings for pieces of india-rubber, which by its elasticity will keep the knife edge bearings that support the arbor frame just tight enough to prevent shaking, and at the same time to be loose enough to allow it to move lengthwise in said bearings with perfect ease. The holes through the frames which receive the screw bolts Q, that support or stays the castings H, H, &c., should be of an oblong form so that the saw can be moved to a perpendicular with the top by moving the set screw marked Q. The driving pulley K, need not be heavier than is necessary for strength and should have a counterbalance to balance the treadle. The pulley O, should have a heavy rim as it will be the best to keep up the momentum. The small pulleys M, and T, will do of wood and should be covered with leather or india-rubber so as to be the more adhesive to the belts. The size of the pulleys will be determined by the speed required. The belts L and S, can be either round or flat, but I design to use the flat india-rubber, which, with the small pulleys covered with the same will not require the belts to be over tight to prevent them from slipping and will thereby greatly lessen the friction on the journals. The spring E, on the front of the machine is to keep the arbor pulley T, against the belt S. The spring E, at the back part of the machine is to keep the belt S, from getting unnecessarily tight when heavy pieces come against the saw; this spring should be shorter and stiffer than the other and can be a spiral or india-rubber.

The work done by a circular saw requires so much power that to make them effectual for hand or foot power, it is absolutely necessary to construct them in such a way that the act of sawing the stuff shall relieve the journals of the friction. It will be seen that as the board X, is pressed against the saw, that the saw and arbor frame will move on a line with the top or with the arrow marked Z, which will not only tighten the belt S, and keep it from slipping, but will also relieve the arbor journals of said friction by its coming upon the belt S; it will also be seen that as the teeth of the saw strikes or cuts down upon the board X, or into it, that all such cutting will necessarily lift the journals of the arbor in the direction of the arrow Y. So to overcome and relieve the friction off of said journals it will be necessary to place the pulley O, or the pulley which carries the belt that runs upon the arbor pulley T, (whether it be either single or double geared) in such an angle from the arbor pulley, that it will bring both the pressing against the saw and cutting of the saw directly upon the belt, thereby preventing nearly or quite all the friction on said arbor journals, and at the same time acting as a common tightener in preventing the belt from slipping. The strain that thus comes upon the belt caused by the resistance while sawing is transferred to and supported by the driving pulley's arbor.

I design this improvement to be used also, in mills driven by steam and water power, for heavy work, and when so used, the driving pulley should be of sufficient weight to bear and overcome all the strain that shall come upon the belt, which will relieve the strain upon the driving pulley's arbor and prevent the friction of the same nearly equal to the strain on said belt.

The portable machines working by a treadle will require for the momentum driving pulleys heavier than all the strain on said belts, and the frictions or strain on their driving pulley's arbors, will be the excess of the weight of said pulley over and above that which is removed from it by coming upon the belt; so it follows, that the strain taken from the saw arbor by the resistance while sawing does not add additional strain on the driving pulley's arbor, but rather relieves from it.

The set screws marked F, F, are for regulating the springs E, E. The set screw R, is for raising and lowering the saw when it is placed under work-benches. The set screw G, is for tightening or regulating the belt L. I design, in building working machines, to place the boxes which contain the journals of the shaft J, about two or three inches further front, at about the place marked thus (*) in the drawings, and also to place the pulleys K, and M, on the same side with the other pulleys. This will bring the pulley K, nearly under the pulley M, so the tightening of the belt L, will relieve in a measure the friction on the journals of the shaft J, bringing it upon the journals of the shaft N, which in its turn will be relieved in a great measure by the cutting of the stuff, which cutting will tighten the belt S. The section of the treadle U, is designed to be of cast iron; the sections W and V, may be of wood. The section W, is for the front; the section V, is for the back and is for the second person, when the work requires two. The holes in the section U, are to receive the pins in the sections W, and V, so that they can be moved to either side or the middle of the machine just as the work on wide or narrow stuff may require.

In operating said machine it will be necessary to keep the belts only tight enough to do the work without slipping, for if they are unnecessarily tight there will be unnecessary friction. In all other respects to be worked as other machines. The spring E, at the back part of the machine, may be dispensed with in some cases without much disadvantage, but when required for heavy work, it will prevent much friction by its use.

I claim—

So arranging the driving and driven pulleys O and T, as to transfer the strain, caused by the resistance while sawing, from the saw arbor to the arbor of the driving pulley, for purposes set forth.

DAVID ELDRIDGE.

Witnesses:
BENJAMIN KELLOGG,
SAMUEL CHUBB, Jr.